Figure 1:
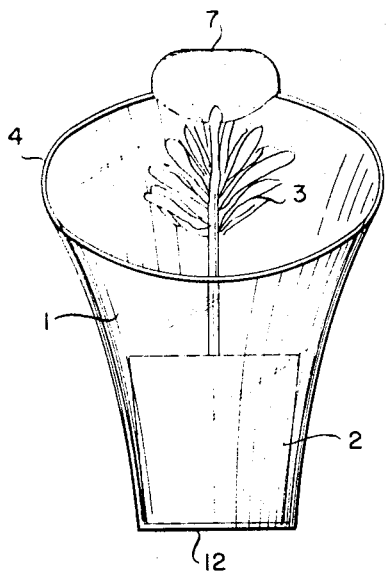

United States Patent [19]
Erling

[11] 3,748,781
[45] July 31, 1973

[54] FLOWER PROTECTOR

[76] Inventor: John Erling, Ledreborg Alle 20, Rasmussen, Gentofte, Denmark

[22] Filed: Aug. 3, 1971

[21] Appl. No.: 168,570

Related U.S. Application Data

[63] Continuation of Ser. No. 853,393, Feb. 27, 1969, abandoned.

[52] U.S. Cl........... 47/34.11, 220/94 A, 206/46 PL, 220/52 B
[51] Int. Cl.............................................. A01g 9/02
[58] Field of Search............................. 47/34.11, 34; 220/DIG. 14, 94 A; 206/46 PL; 229/52 A, 52 B, 2.5, 3.5

[56] References Cited
UNITED STATES PATENTS
3,385,465   5/1968   Bliss................................. 220/94 A
3,351,270  11/1967   Hohnjec........................... 229/52 B

*Primary Examiner*—Robert E. Bagwill
*Attorney*—Lawrence E. Laubscher

[57] ABSTRACT

A flower protector for protecting a potted plant comprising a unitary open-topped cup-shaped member formed of transparent material. The member consists of bottom and side wall portions wherein the side wall portion flares outwardly at its upper end terminating in a continuous rim contained entirely within a plane arranged at an acute angle with the longitudinal axis of the protector. A carrying handle is formed adjacent the uppermost point on the rim and is defined by a concave inverted integral recess that extends upwardly beyond said uppermost point on said rim.

1 Claim, 4 Drawing Figures

PATENTED JUL 31 1973

3,748,781

INVENTOR.
John E. Rasmussen

BY
Lawrence E. Laubscher
ATTORNEY

FLOWER PROTECTOR

This application is a continuation of application Ser. No. 853,393, filed Feb. 27, 1969 now abandoned.

The present invention relates to a flower protector for the protection of flowers or a plant in a flowerpot while in a nursery garden, during transportation and on sale in a store.

Several different protectors or wrappings for the protection of flowers or a plant an a flowerpot are known, but these protectors are rather complicated, and by some embodiments the protector is a closed wrapping in which the flowers or the plant may be preserved some way, for instance cooled down. Flower protectors elaborated as a bag of smaller or greater volume and sealed by folding or taping the bag above the flowers or the plant are also known. By that procedure the bag gets some folds so that the flowers or the plant in the bag are not clearly visible which is disadvantageous for instance when they are for sale in a shop. It is not either possible to admit water or air to flowers or a plant in such a bag, which is disadvantageous, because it is necessary for the flowers or the plant to be able to "breathe" in order to keep fresh and retain an attractive appearance. It is furthermore troublesome to place flowers or a plant with a flowerpot in such a bag.

The object of the present invention is to provide a flower protector by which the above-mentioned disadvantages are remedied.

The object of the present invention is a flower protector of elastic transparent plastic elaborated in one piece with a plain outside and formed as a cup with an open top, with space for one or more flowers or a plant in a flowerpot at the bottom, and the upper edge of which cup is situated in an inclined plane in relation to the axis of the protector, and that the two parts situated opposite to each other forming the protector with the highest difference of level are of essentially different height.

Another object of the invention is that the highest part may have a turning which may form a handle.

Another object of the invention is that the cup has a cover to cover earth placed in the flowerpot, the central part of which cover has cuttings forming flaps, one of which cuttings is extended to the edge of the cover.

Another object of the invention is that its lower part on a level with a flower pot is coated with an agent making that part of the protector non-transparent.

By such a flower protector which is open at the top the flowers or the plant may "breathe" freely and may be douched with water and thereby keep fresh as long as possible and retain an attractive appearance. The protector has a plain transparent outside, so that the flowers or the plant inside are visible to the spectator, and on account of the inclined elaboration of the upper part it is also easy to see the flowers or the plant which is of advantage when on sale in shops or in super markets, where the customer has to make his own choice. When placing more protectors side by side and with the high side of a protector facing the low side of another protector the flowers or the plant therein are well protected by the protector. The elaboration of the flower protector is so simple that the costs of production are very small, which is very essential as a rise in price by the sale of flowers or a plant in such a protector must be very small.

Figure 2:
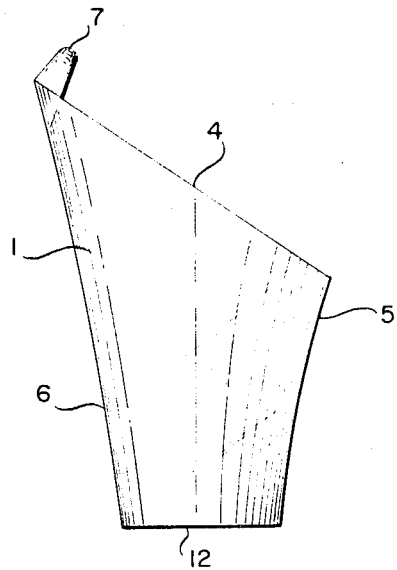
Figure 4:
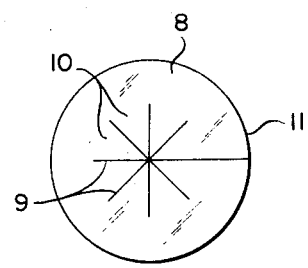
Figure 3:
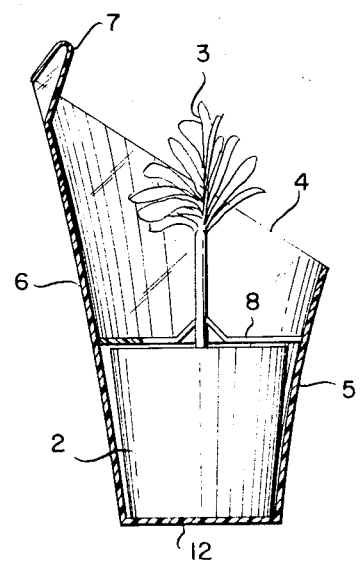

An embodiment of the flowerpot according to the invention is illustrated in the drawing, in which FIG. 1 shows a flower protector with a flowerpot therein with flowers or a plant, in front view, FIG. 2 the same in side elevation, FIG. 3 the same in a longitudinal section and in side elevation with a cover located above the flowerpot, and FIG. 4 a cover to place above the flowerpot in top view.

The flower protector is formed as a cup 1 with an open top elaborated in one piece, which cup has a plain and transparent surface, and at the bottom of which a flowerpot 2 is located with flowers or a plant 3 therein. The upper edge 4 of the protector is situated in an inclined plane in relation to its centre axis, so that the two parts 5 and opposite to each other forming the protector are of essentially different height. The highest part of the protector has a turning 7 which may form a handle for carrying the protector with the flowerpot with flowers or a plant therein. When the flower protector with the flowers or a plant therein is sold in a shop or in a super market it has a disk-formed cover 8 located above the flowerpot, the central part of which is by means of a slit or a cutting 9 elaborated as flaps 10. One of these slits or cuttings 9 is extended to the edge 11 of the cover, in which way the cover may be turned in round the flowers or the stalk of the plant, by which the flaps 10 place themselves tightly to the stalk thus providing a good cover for the earth in the flowerpot. It may sometimes be advantageous to remove the flowerpot from the flowers or the plant and the adhering earth, to save thereby a flowerpot, upon which the flowers or the plant with earth are placed in the protector, which serves then at the same time as a flowerpot. In that case the lower part of the protector on a level with a flowerpot is made non-transparent by means of paint or the like.

What I claim is:

1. A flower protector for protecting a potted plant, comprising
a unitary open-topped cup-shaped member (1) formed of an elastic transparent synthetic plastic material and including a bottom wall (12) and a generally cylindrical side wall, said side wall being upwardly divergent and terminating at its upper extremity in a continuous upper edge (4) contained in a plane that is inclined to the axis of the protector, thereby defining diametrically opposed side wall portions (5, 6) of essentially different height; the uppermost portion of said side wall portion of the greatest height being turned to define a concave upwardly extending downwardly facing carrying handle portion (7) arranged wholly on the opposite side of said inclined plane from said bottom wall, whereby the protector may be carried with flowers or a plant therein.

* * * * *